(12) United States Patent
Walker

(10) Patent No.: US 7,152,550 B2
(45) Date of Patent: Dec. 26, 2006

(54) AUTOMATIC ANIMAL FEEDING AND WATER PROVIDING APPARATUS

(76) Inventor: Ralph Walker, 6340 Glenhills Way, Sacramento, CA (US) 95824

( * ) Notice: Subject to any disclaimer, the term of this patent is extended or adjusted under 35 U.S.C. 154(b) by 196 days.

(21) Appl. No.: 11/029,514

(22) Filed: Jan. 6, 2005

(65) Prior Publication Data

US 2006/0144339 A1   Jul. 6, 2006

(51) Int. Cl.
*A01K 5/02* (2006.01)
*A01K 7/02* (2006.01)
(52) U.S. Cl. ................. 119/51.5; 119/51.11; 119/51.13
(58) Field of Classification Search ............... 119/51.5, 119/51.01, 57, 51.04, 51.11, 51.12, 51.13, 119/51.14, 61.2, 61.5, 56.1, 81
See application file for complete search history.

(56) References Cited

U.S. PATENT DOCUMENTS

| | | | | |
|---|---|---|---|---|
| 2,791,984 A | * | 5/1957 | Franklin | 119/51.12 |
| 3,134,360 A | * | 5/1964 | Lewis | 119/51.01 |
| 3,196,835 A | * | 7/1965 | Bergevin | 119/51.11 |
| 3,340,851 A | * | 9/1967 | Hugo et al. | 119/51.13 |
| 3,527,191 A | * | 9/1970 | Zimmitti et al. | 119/51.11 |
| 3,638,618 A | * | 2/1972 | Strother | 119/51.12 |
| 3,741,162 A | * | 6/1973 | Lopez | 119/51.13 |
| 3,754,527 A | * | 8/1973 | Jenkins | 119/51.14 |
| 3,762,373 A | * | 10/1973 | Grossman | 119/51.11 |
| 3,900,007 A | * | 8/1975 | Smith | 119/51.13 |
| 3,955,537 A | * | 5/1976 | Yujiri | 119/51.13 |
| 3,985,104 A | * | 10/1976 | Klemer | 119/51.12 |
| 4,000,719 A | * | 1/1977 | Richards | 119/51.13 |
| 4,069,793 A | * | 1/1978 | Gower | 119/51.13 |
| 4,256,054 A | * | 3/1981 | Hitchcock | 119/51.11 |
| 4,422,409 A | * | 12/1983 | Walker et al. | 119/51.11 |
| 4,473,031 A | * | 9/1984 | Bobeczko | 119/51.12 |
| 4,688,520 A | * | 8/1987 | Parks | 119/51.11 |
| 4,735,171 A | * | 4/1988 | Essex | 119/51.12 |
| 5,433,171 A | * | 7/1995 | Ewell | 119/51.5 |
| 6,055,933 A | * | 5/2000 | Lyden | 119/58 |
| 6,062,166 A | * | 5/2000 | Macrina | 119/51.11 |
| 6,135,056 A | * | 10/2000 | Kuo | 119/51.11 |
| 6,145,472 A | * | 11/2000 | Vittuari et al. | 119/51.5 |
| 6,196,158 B1 | * | 3/2001 | Yang | 119/51.11 |
| 6,367,417 B1 | * | 4/2002 | Gal et al. | 119/51.5 |
| 6,427,628 B1 | * | 8/2002 | Reece | 119/51.11 |
| 6,622,655 B1 | * | 9/2003 | Springett | 119/51.2 |
| 6,701,866 B1 | * | 3/2004 | Shieh | 119/51.11 |
| 7,051,675 B1 | * | 5/2006 | Mayer et al. | 119/51.11 |
| 2002/0096120 A1 | * | 7/2002 | Busha | 119/51.5 |

* cited by examiner

*Primary Examiner*—Yvonne R. Abbott
(74) *Attorney, Agent, or Firm*—Mark C. Jacobs

(57) ABSTRACT

An apparatus for automatically supplying both food and water to an animal according to a predefined schedule input into a timer wherein food is introduced into a food ring mounted on a rotatable carousel from a feed hopper and the rotation of the carousel being controlled by the timer. Water is introduced also at timed intervals through spray nozzles for several purposes, namely, to premoisten pelletized food prior to it being eaten and to clean the food ring subsequent to food consumption or removal of any leftover food, which food removal takes place by gravity. Water is also introduced into a drinking bowl for the pet to consume. Periodically, according to the input schedule, the water is automatically drained and subsequently the bowl is refilled.

23 Claims, 9 Drawing Sheets

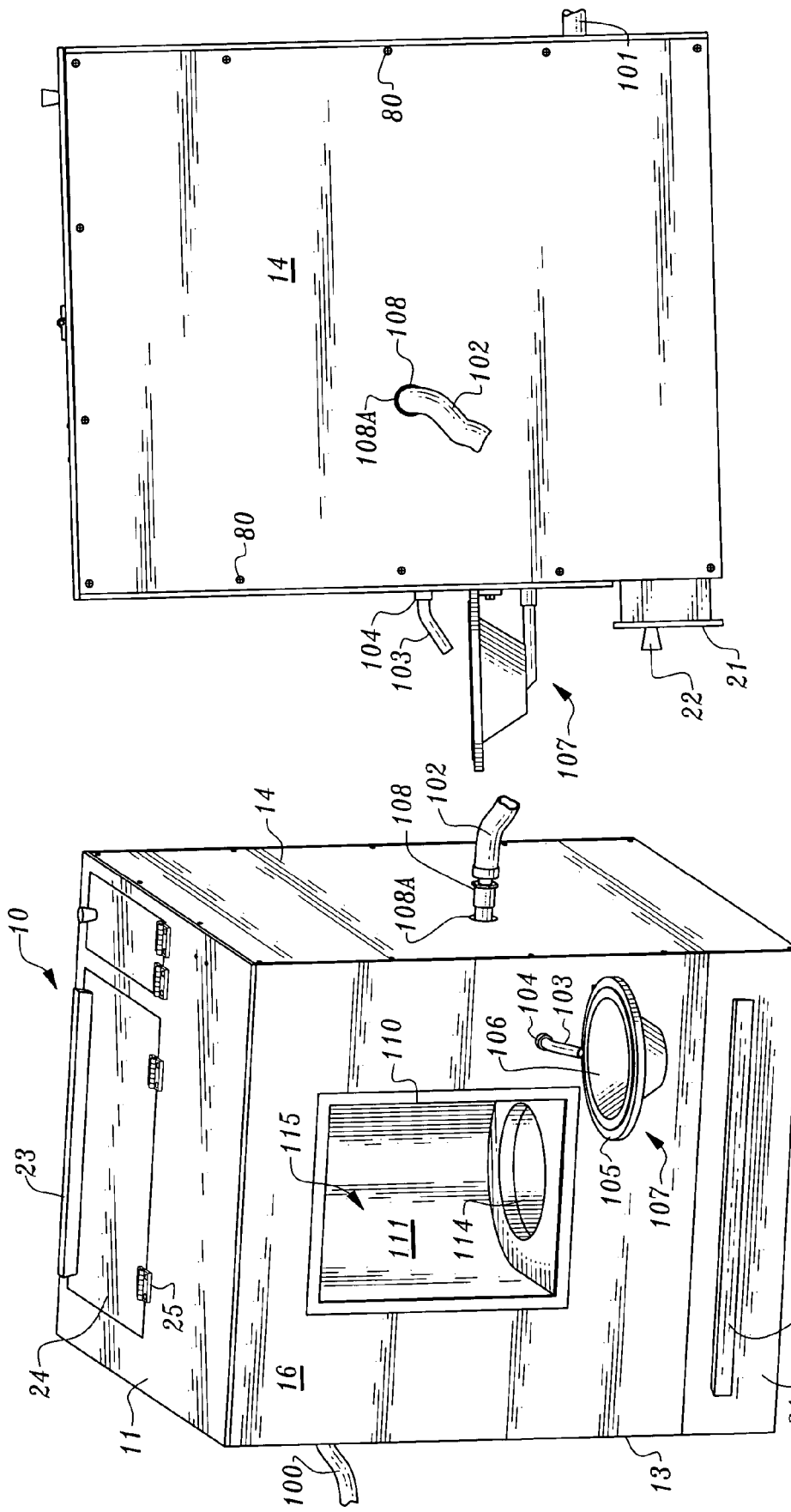

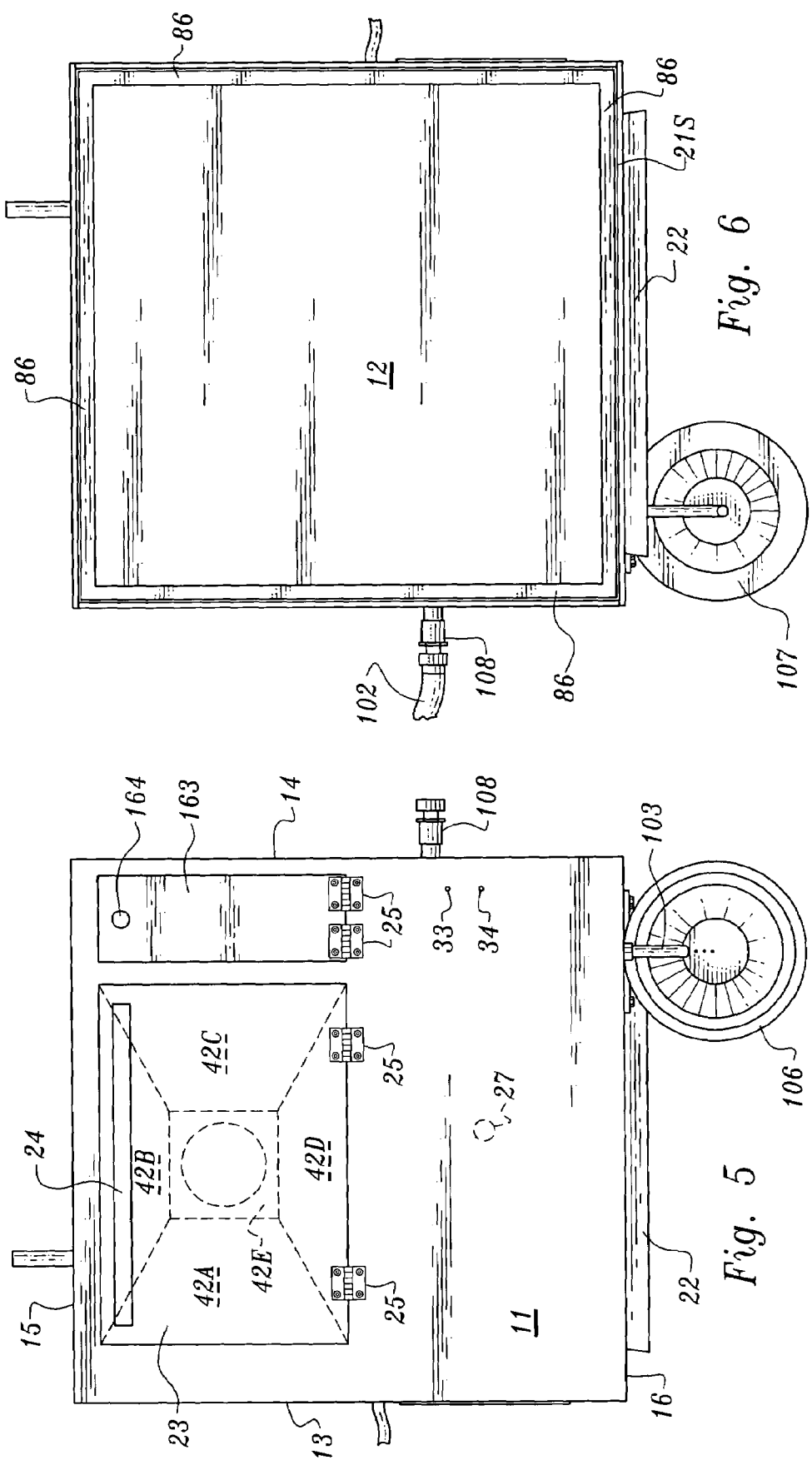

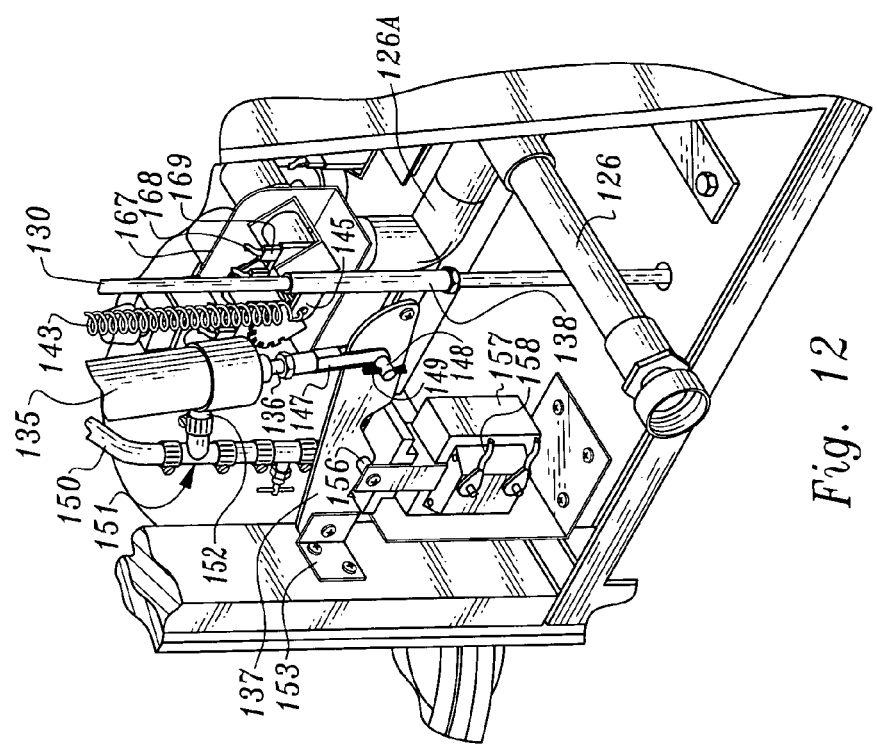
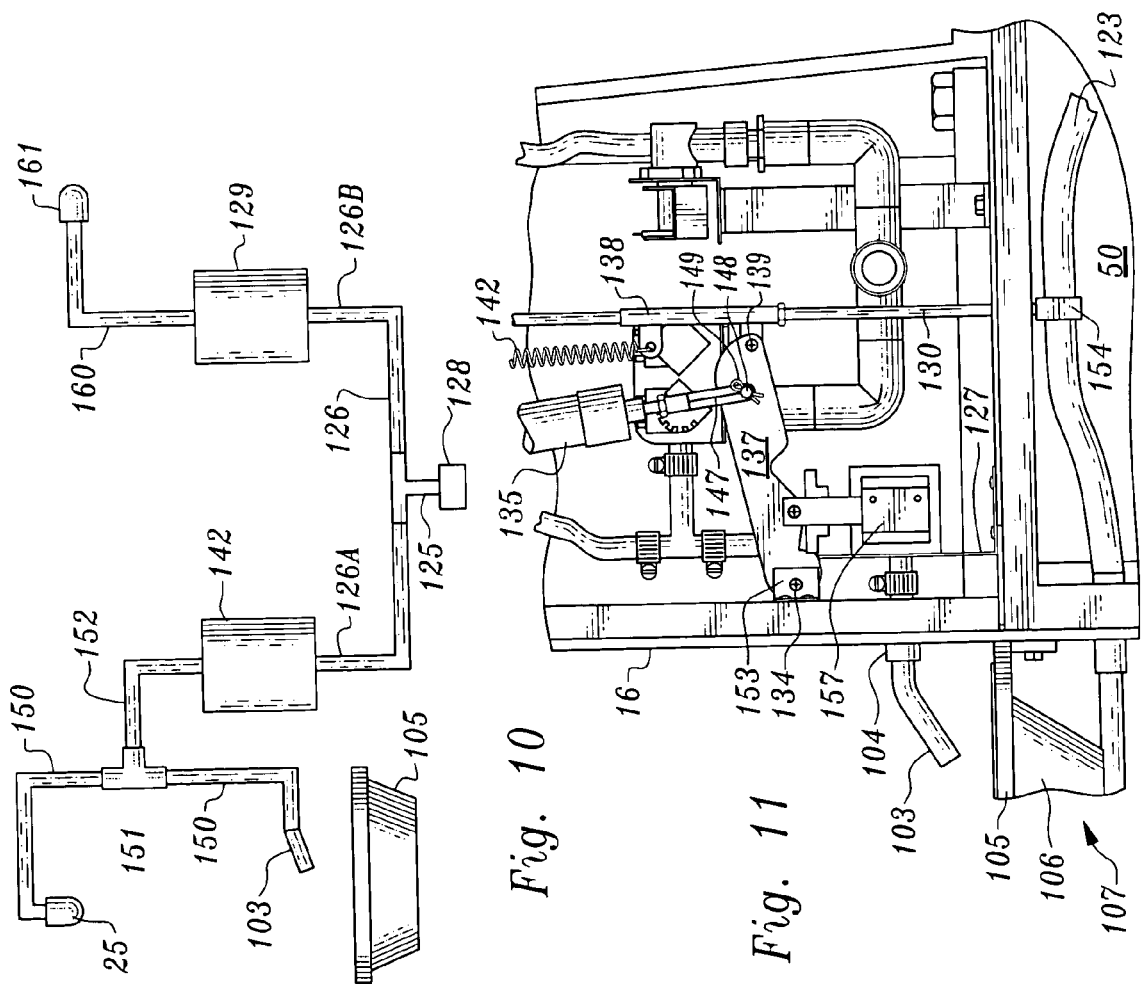

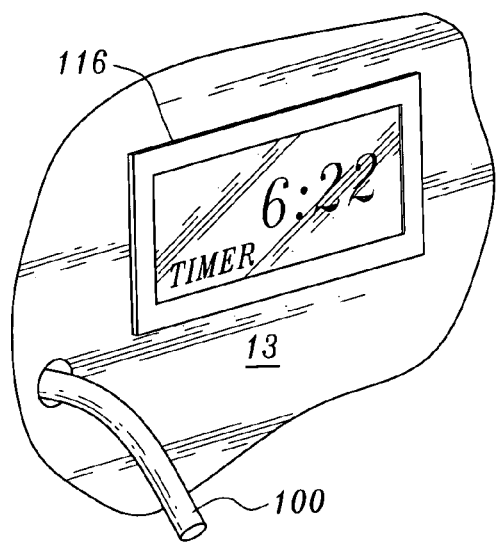
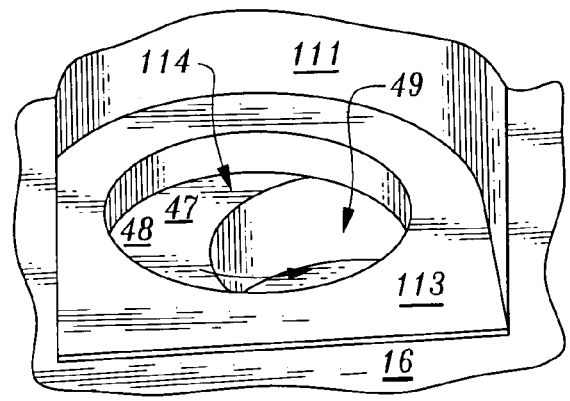
Fig. 14
Fig. 13
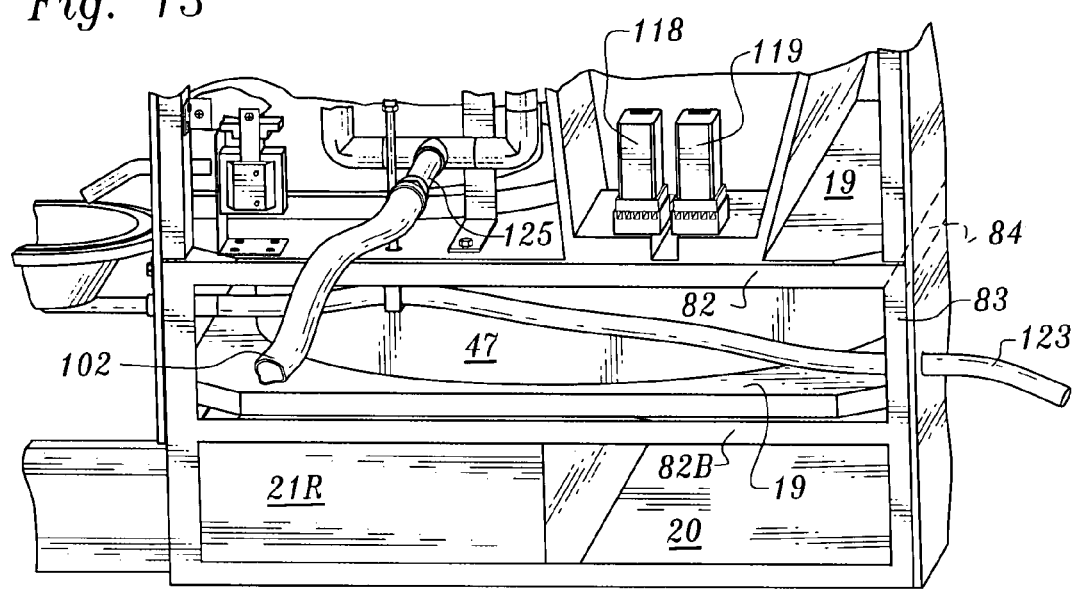
Fig. 15
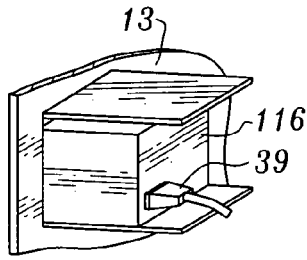
Fig. 16
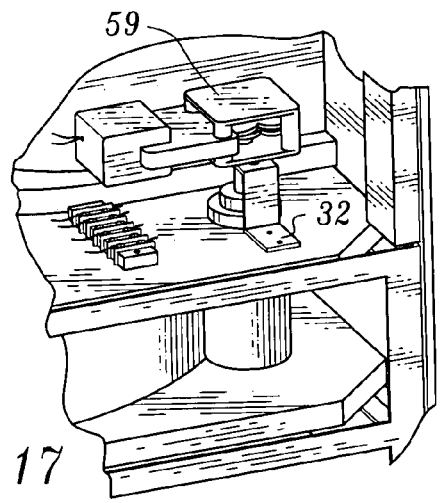
Fig. 17

AUTOMATIC ANIMAL FEEDING AND WATER PROVIDING APPARATUS

RELATION TO OTHER PATENTS

This patent improves upon the technology of U.S. Pat. No. 4,422,409 issued Dec. 27, 1983, in the names of Ralph Walker and David Bories.

FIELD OF THE INVENTION

This invention relates to an improved animal feeding and watering apparatus and more particularly, to an apparatus that not only stores food and releases controlled amounts of food and controlled amounts of water from a self-contained remote source at predetermined intervals to an animal. Subsequent to the feeding, the feed trough is emptied and rinsed clean for the next event.

BACKGROUND OF THE INVENTION

Apparatuses for feeding animals are known to the art. These work on various operating principles. Some require activity by the animal to activate food release. Typically an animal must be trained to impact a lever to institute action. Note for example U.S. Pat. No. 3,134,360. If however the animal fails to act properly, the animal may go unfed. Over a several day period, a life-threatening problem could arise.

Some feeding devices are gravity fed and may not always operate correctly, if not properly placed in position. Note for example U.S. Pat. No. 3,754,527.

Other feeding devices work on a timed sequence but many are quite complicated and quite expensive. See for example U.S. Pat. No. 3,762,373. None of the patents cited, and others reviewed, have a built-in means for cleaning the food dish from leftover food nor do they possess a means for introducing water to moisten the food as well as for cleansing the food trough.

Other patents with which the inventor has become acquainted are Parks U.S. Pat. No. 4,422,409 and Ewell U.S. Pat. No. 5,433,171. Ewell uses two separate side by side bowls which are replenished based upon a pair of pressure sensing mechanisms for generating two signals to refill the respective bowl from a water tank internal to the housing and from a dry hopper respectively. While these patents are not being officially reviewed by the examiner of this application, still they represent information gleamed by the applicant during the development of this invention.

Parks uses a water dispenser tied into a timer device as is shown in FIG. 1 and discussed at several locations in the patent. However this apparatus requires the animal to move a lever arm to access the water. A minimum of training of the animal is required however and no bowl is provided for retention of water.

While the technology of my previously co-issued patent works successfully, over the years I have noted the need to provide fresh water to the more than likely dog being fed on a time cycle basis. In the past, a separate dish of water could become consumed and not replenished during the owner's absence or the dish could be accidentally spilled or contaminated by bugs falling into it such that Fido or Rover, though quite well fed, remained quite thirsty.

Therefore, I determined that there was indeed room for an improvement on the preexisting apparatus to provide automatic water replenishment and replacement in the same apparatus that would automatically feed the animal. The apparatus of this invention fills such needs.

Not only does this apparatus have applicability to pet owners, but also it is suitable for installation at animal boarding centers, since no pretraining is necessary for provision of either food or water for each animal. In light of this no pretraining requirement, the apparatus can be successfully utilized in circuses and zoos.

SUMMARY OF THE INVENTION

There is provided an improvement to U.S. Pat. No. 4,422,409 in that the apparatus of this invention not only automatically feeds the animal according to a timed schedule and provides a small amount of water to moisten dry dog or cat or other animal food and then clean the feed trough and it also provides a source for clean drinking water that is replenished automatically subsequent to consumption. The apparatus of this invention includes an enclosure housing a carousel that rotates as a result of a timer's actuation. On this carousel is a food ring or trough that can be filled with dry food from a source within the housing. Water can be added to premoisten the food and water can also be added to a separate drinking bowl as well. Upon a preset defined amount of time, whether the food has been consumed or not, the food ring or trough will be emptied and washed to prevent bug infestation and the water in the water bowl drained and replenished.

It is a first object of this invention to provide a combined animal feeding and watering apparatus that work on a timed cycle basis.

It is a second object to provide a self-operating feeding and watering apparatus that is also self-cleaning.

It is a third object to provide a combined feeder-waterer that also premoistens food for the animal.

Other objects of the invention will in part be obvious and will in part appear hereinafter.

The invention accordingly comprises the device possessing the features properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

BRIEF DESCRIPTION OF FIGURES

FIG. 1 is a front elevational view of the combined animal feeder and waterer of this invention.

FIG. 2 is a right side elevational view thereof.

FIG. 5 is a top plan view of this invention.

FIG. 6 is a bottom plan view of the apparatus of this invention.

FIG. 10 is a diagrammatic view that illustrates the flow of water to the watering dish and to the feed trough.

FIG. 11 is a view taken along 11—11 of FIG. 6.

FIG. 12 is a close-up view of a portion of the structure shown in FIG. 9.

FIG. 13 is a close-up view of the timer forming part of this invention.

FIG. 14 shows the food bowl during the course of the wash cycle.

FIG. 15 is a right side lower elevational view with the panel wall removed.

FIG. 16 is a top perspective view of the timer compartment shown with left panel and top panel removed.

FIG. 17 is a top plan view of the motor compartment and its separation from the solid feed depository.

DESCRIPTION OF THE PREFERRED EMBODIMENT INTRODUCTION

Figure 3:
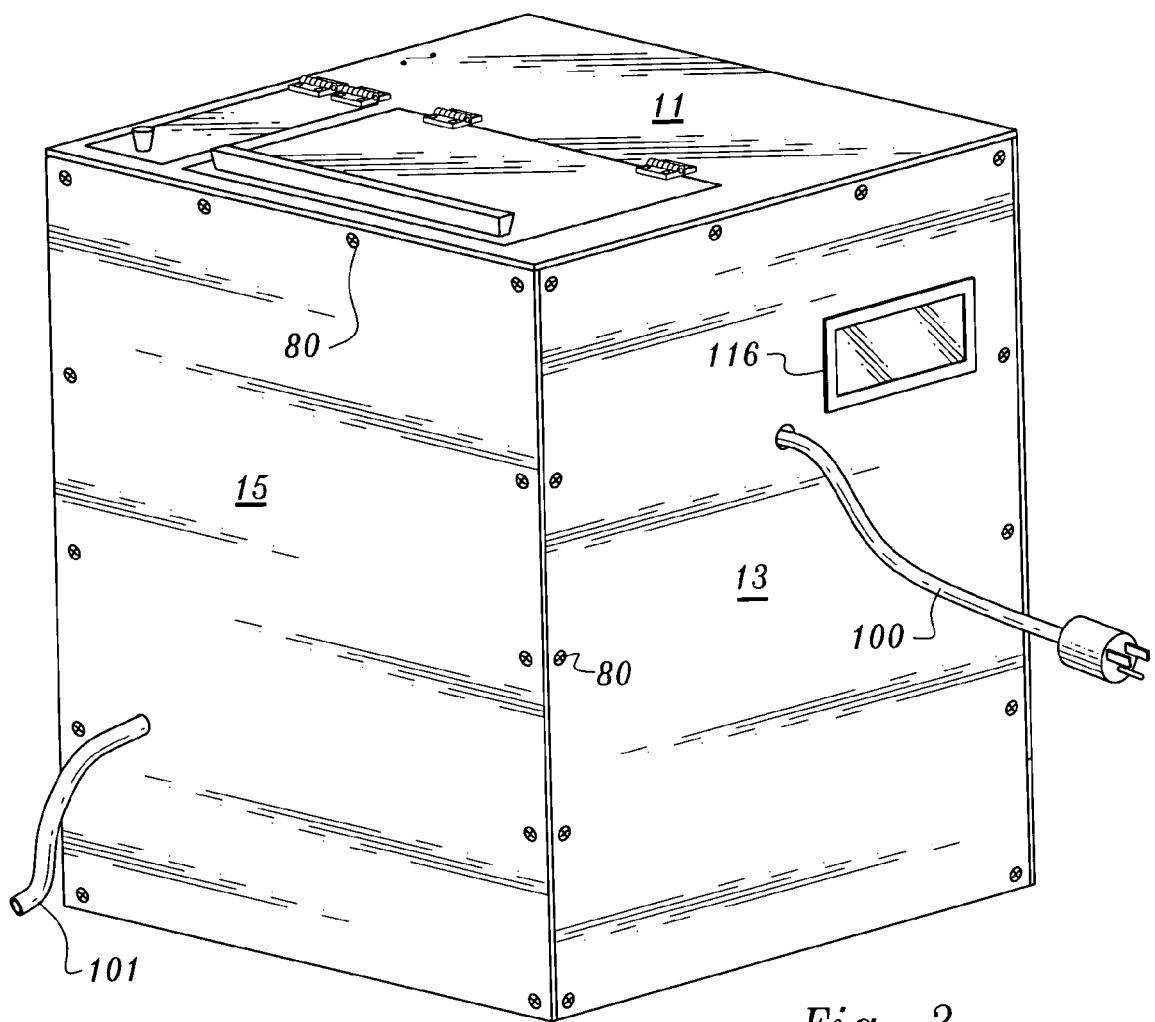
FIG. 3 is a left rear perspective view of this invention.

This application pertains to a significant improvement to the animal feeder disclosed and claimed in U.S. Pat. No. 4,422,409 where I am a coinventor. Whereas that patent pertained solely to an animal feeder. This application is based on the structure of that patent to which an animal water providing feature is added to not only premoisten dry food but to also provide drinking water for the dog. In addition, other features have been introduced to further improve the apparatus of my previous patent. The reader is quickly referred to FIG. 18, a side sectional view of the previous prior art apparatus before modification, and to FIG. 1 which shows the animal watering feature currently present.

DESCRIPTIVE INFORMATION

Referring now to FIGS. 1–5 of the drawings apparatus 10 is in the form of a box having a top wall 11, a bottom wall 12, side walls 13,14, rear wall 15, and front wall 16. If desired, the side walls 13,14 may be provided with elongated notches 17,18 shown in FIG. 19, for slidably receiving front wall 16 therein. Walls 13–16 may be of wood, metal, glass, plastic, opaque or transparent, and removable for easy access to the interior of the apparatus 10 for cleaning the same such as, by screw removal assembly as by screws 80.

Referring again to FIG. 9, a partition wall 19 optionally disposed upon a wire grid 84 is spaced from bottom wall 12 forming a waste compartment 20. For ease of cleaning, a removable drawer 21 having a handle or knob 22 may be slidably mounted in compartment 20 and easily removed for cleaning the same.

Figure 9:
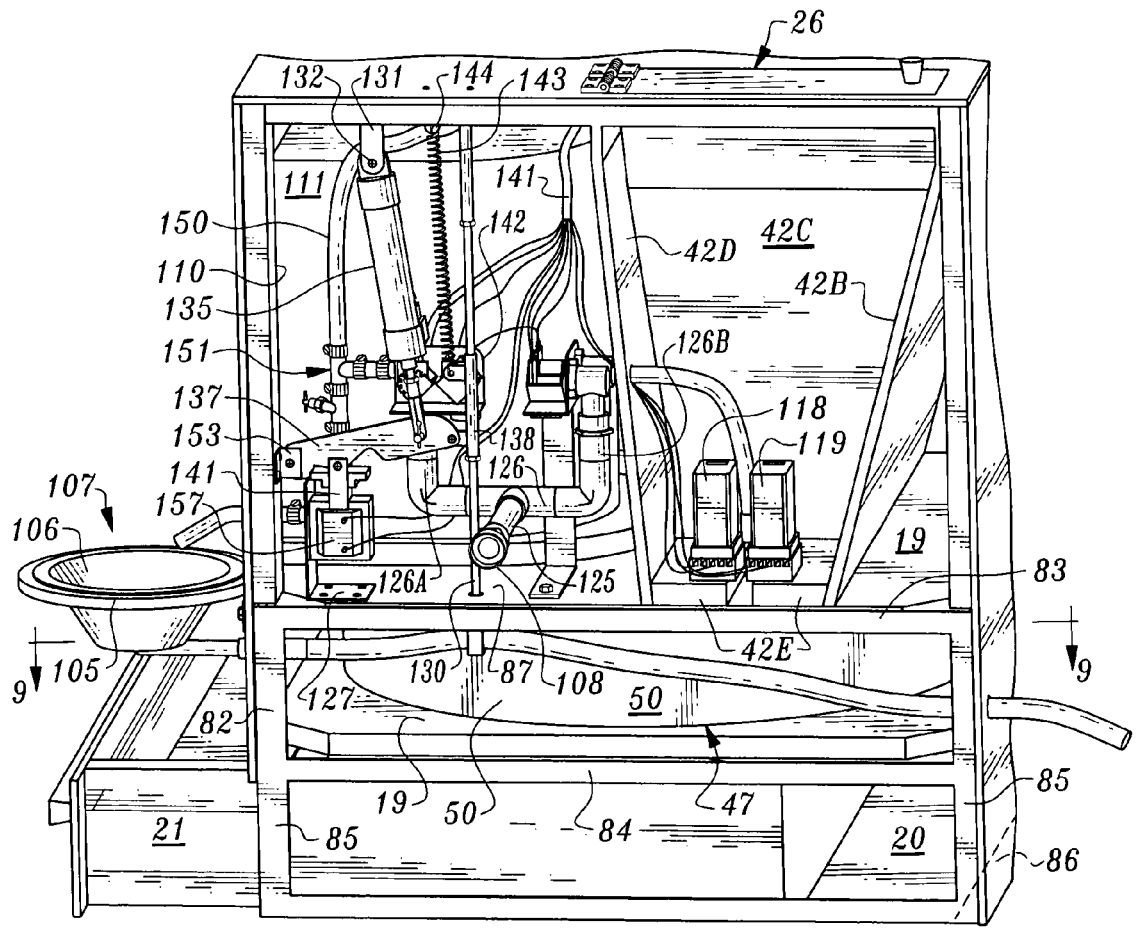
FIG. 9 is a side elevational close-up view of the components used to add water to the watering dish of FIG. 8.

As shown in FIG. 9, a door 23 having knob 24 is optionally hingedly mounted to top wall 11 by hinges 25 closing off opening 26. In this manner, access to the food bin 42 in apparatus 10 is provided.

Figure 7:
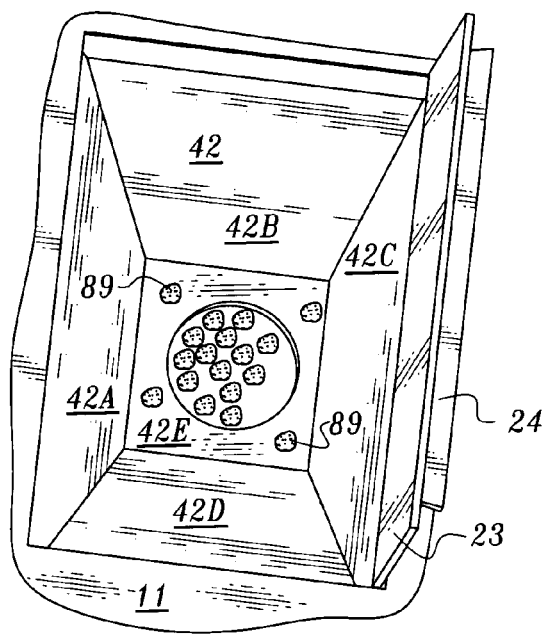
FIG. 7 is a top perspective view of the new feed hopper for inputting dry food which forms a part of this invention.

As seen further in FIG. 9, the food storage compartment 42 is a trough having inwardly tapering side walls from top to bottom, here three of the four walls are seen. These walls are the forward wall 42D, the rear wall 42B, and the right side wall 42C. The fourth wall, 42A is seen in FIG. 7.

Shown disposed between the front and rear walls, 42B and 42D, are the two solenoids 118,119 which control the release of the drain and the flow of water respectively. These are mounted on blocks 42E which serve to provide structural rigidity to the side walls aforementioned, and they are attached to wall 48.

Support 87 rests on a metallic L-shaped grid 83 that forms a shelf for retention of support 48. The generally rectangular grid 83 is supported at the corners by vertical members 82 to space the upper grid 83 from intermediate grid 84 which second grid is coextensive therewith. A second vertical set of vertical members 85 at the same corner locations supports grid 84 and terminate at lower grid 86. Drawer 21 seen in part in this view rests on bottom wall 12 which is supported by lower grid 86. Note that support 87 did not exist in my prior unit.

Carousel 47 seen here is also seen in a side elevational view in FIGS. 9 and 15, also seen in part in FIGS. 11 and 14.

Prior to discussing the various components seen in FIG. 9, from an operational nature, reference is again made to FIG. 1. Here front wall 16 and the drawer 21 disposed below the wall are seen, drawer 21 has a handle 22 thereon. Curved front enclosure wall 111 is seen framed in by frame 110 to invite the animal to the floor panel of the food enclosure area 115 and to the head access opening 114 in floor panel 113. This head opening 114 leads to the carousel's food ring when the carousel is in the proper timed position to permit access to the food therein.

Water trough 105 is filled by spout 103 from the first water stream. The trough is retained in position by a grommet 104 or other retaining means. Hose 102 provides the water to be utilized for both drinking and food softening.

FIG. 2 is a side elevational view and shows hose 102 connected to threaded connector 108 disposed in aperture 108A. FIG. 3 is a perspective view that illustrates the blank rear wall 15 and the left wall 13 both of which are retained by screws 80. Also seen in this view is clock timer 116 which controls the operation of the carousel for the feed cycle, the alternating current power line 100 connected to the internally disposed motor, and other electrically operated components.

Figure 4:
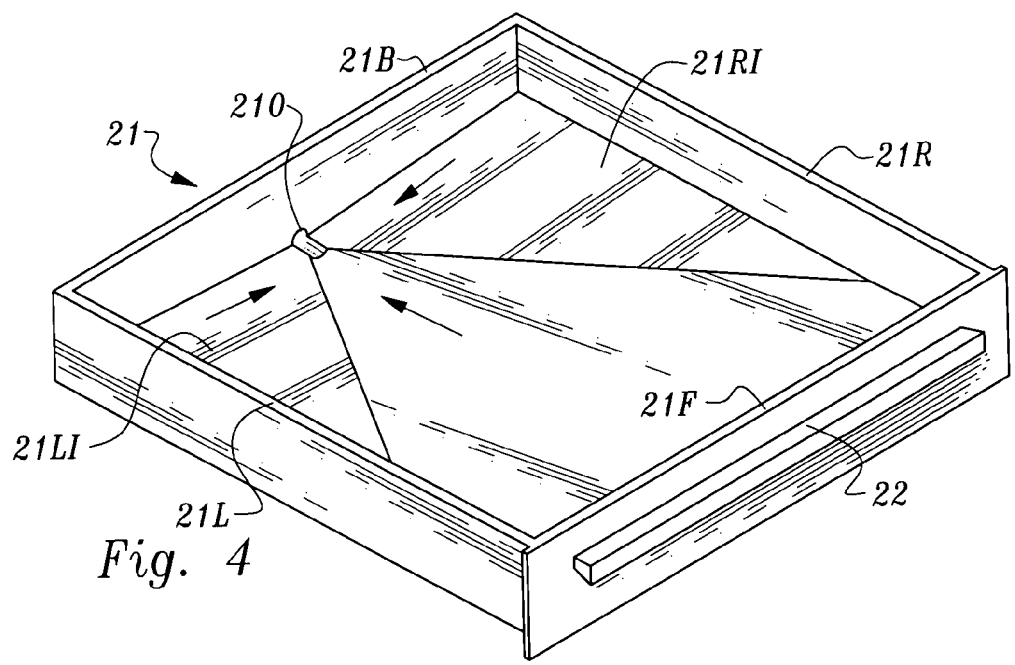
FIG. 4 is a top perspective view of a drawer forming part of this invention.

The discussion now moves to FIG. 4 and the drawer for the collection of unused water and leftover food pellets. Drawer 21 has two vertical outside spaced side walls 21L and 21R and a rear wall 21B normal thereto. The front wall seen in FIG. 1 is designated 21F. Rear wall 21B also has a through bore 21-O therein at the bottom center thereof for the drainage of water. Walls 21-LI and 21-RI are interior walls that slope both rearwardly and downwardly from the front corners of the drawer. Bottom wall 21S slopes rearwardly only from front wall 21F to ensure the egress of water that accumulates in the drawer through the opening 21-O. Handle 22 while shown as an elongated bar, can be any conventional handle available in the marketplace and is attached by two screws or bolts in a conventional manner. If desired, a removable stopper may be inserted into exit bore 21-O or said bore may be threaded or otherwise facilitated for the connection of a drainage line 101.

In FIG. 5, a top plan view of the door 23 to the feed storage area is seen with handle 24 thereon retained by hinges 25. The bin 42 and its walls are shown in dashed line to indicate their hidden presence beneath the access door 23 a second 163 with a handle 164 may also be portioned adjacent the primary door 23 at the rear top wall 11 to permit access to the solenoids 118 and 119 seen in FIG. 18 as well as to the controls of the timer 116 seen in FIG. 13 and thus avoid the necessity of removal of the side wall 14.

A pair of rivets 33 and 34 retain the piston hanger 131 to the top wall. A threaded fitting to be discussed infra for the introduction of water is also disposed in the top wall and seen in FIG. 5 is the removably disposed drinking bowl 106 sits in a mouth ring 105 to thereby define the drinking trough 107. The trough 107 and its spout 103 for filling of the bowl are also seen in this view the removability of the bowl permits easy cleaning.

In FIG. 6, which is a bottom plan view, the drawer 21 is shown partially ajar in order that the bottom 21S could be seen by the reader. The grid 86 that holds the shelf 12 beneath the drawer 21 is seen as well. The drinking trough is seen repositioned in view of the nature of the view.

Figure 19:
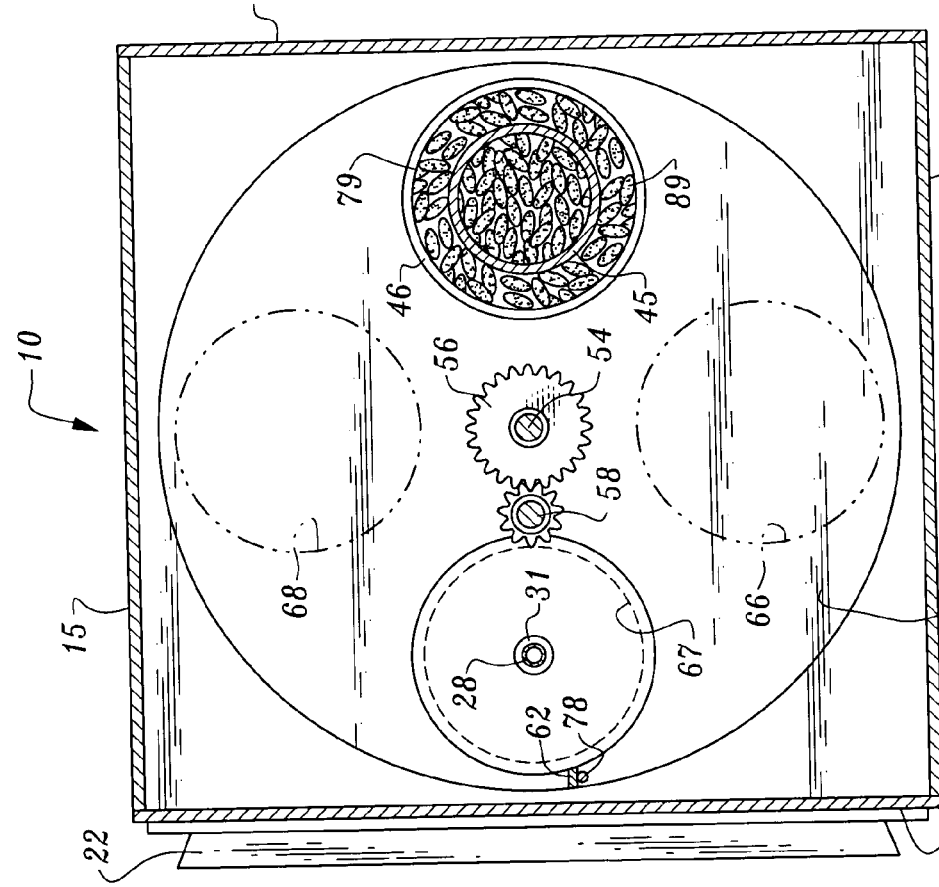
FIG. 19 is a view taken along line 09—09 of FIG. 9.

The discussion now moves to FIG. 7 which depicts the interior of the feed hopper also referred to as the food storage bin 42 which has four tapering downwardly and inwardly walls designated 42A, 42B, 42C, and 42D, and the top wall 48 of the carousel 47. Reference should also be made to FIG. 19 which shows the configuration of the carousel 47 and its location above the drawer 21. More on this infra. Note from FIG. 19 how the carousel has but one opening shown here in full. Also, in FIG. 7, food pellets 89 are shown lying around on the top wall 48 of the carousel and on bottom wall 42E of the hopper 42. More about what happens to the food pellets 89 infra.

Figure 8:
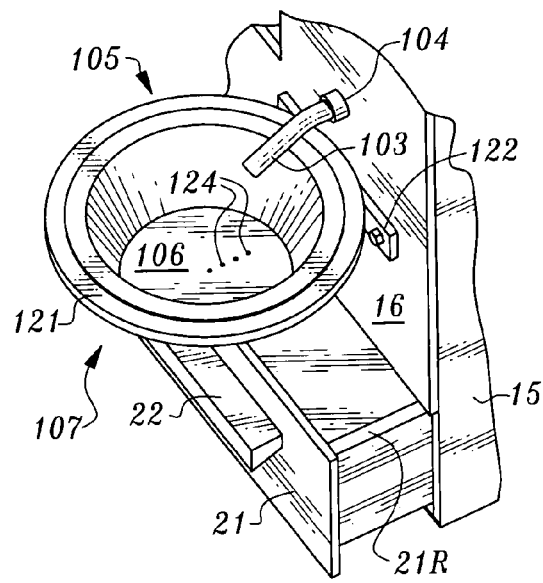
FIG. 8 is a top perspective view of the water dish, waterspout, and drain forming parts of this invention.

In FIG. 8 the water trough 105 is seen. The rim of this trough is designated 105 and is attached to a mount member 122 which has been screwed to wall 16 in a conventional manner. The rim 105 retains the bowl 106 which has as series of drain openings 124 bottomly disposed therein in any suitable pattern. The spout 103 for filling bowl 105 is retained in a fixed position by a grommet 104 disposed in a suitable unnumbered bore in wall 16. Portions of the drawer and the support structure are also seen in this view.

Figure 22:
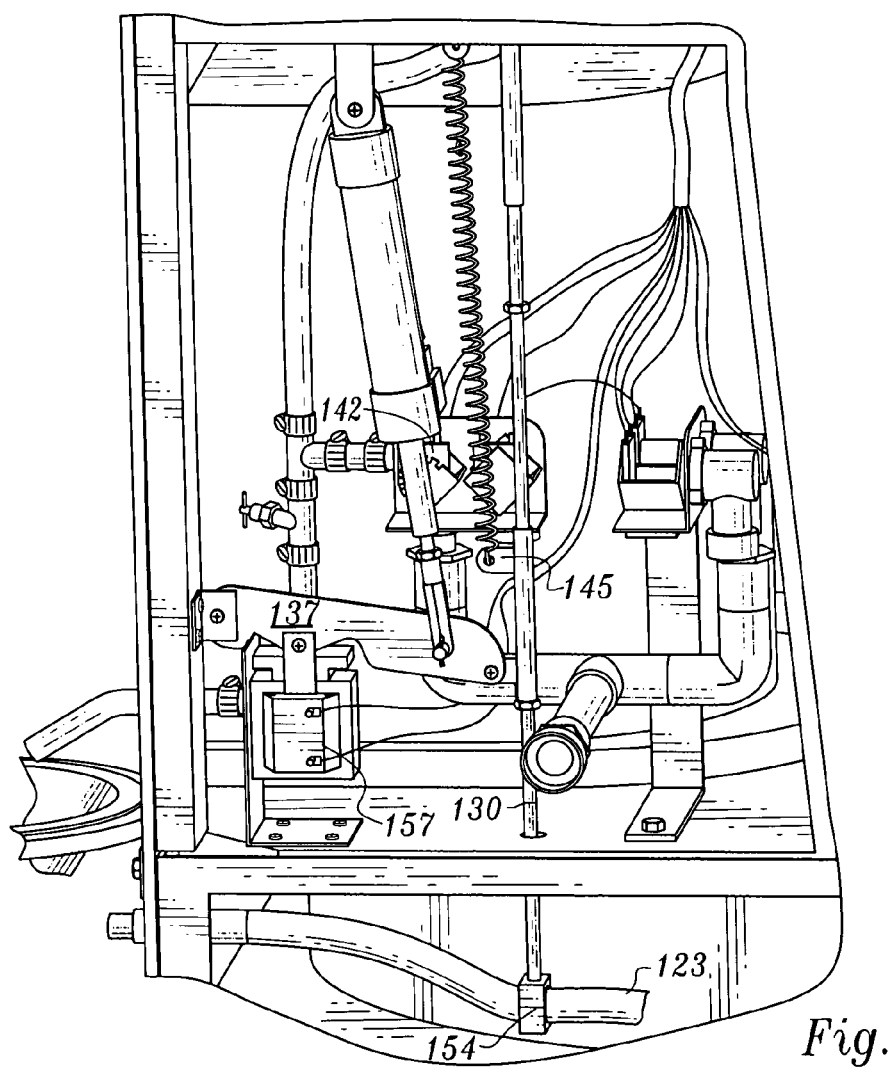
FIG. 22 is related to FIG. 9 and depicts a different point and time in the cycle for adding water to the trough with reference made to elements 135 and 137.

Rather than discuss FIG. 9, which is next in order, FIG. 9 shall be considered in conjunction with its related FIG. 22. The discussion therefore moves to FIG. 10, a descriptive diagrammatic view of the three streams of water which depicts the flow of water through the water lines shown FIG. 9. Water from hose 102 not shown but which is connected at the wall to a conventional household hose coupler 108 disposed in an aperture 108A in a housing wall enters pipe 125 and divides into two directional flows in U-pipe 126 toward each of two arms 126A and 126B. The water flows through the right arm 126B to pump 129 and through pump 129 to the water line 160 and ultimately to spray head 161 to wash the carousel clean after the dog has eaten as much as he or she desires. The water that enters the other section of the U-pipe section 126A flows, due to operation of the motor 142, via line 152, seen in FIG. 12, and then to tee 151 and into line 150. This line 150 leads in two directions. The lower direction as seen in both FIGS. 9 and 10 leads to the water trough 105 for filling of the trough in the manner to be described infra. The other direction of the line goes to premoisten the food to render it easier to chew. Thus, there are three uses for water from the incoming hose, drinking water, premoistening, and cleaning of the eating zone.

In FIG. 11 some of the mechanical aspects of the entire apparatus interior as seen in FIG. 9 are shown. The portion of the apparatus that relates to the filling of the drinking bowl 106 is seen here. In brief, water enters through spout 103 retained by grommet 104 into the bowl 106 held by rim 105 attached to mount plate 122 seen attached by screws, unnumbered, to the front wall 16. Water exists out drainpipe 123 that passes through the front wall and out the rear to the ground or a drain. See FIG. 9.

A clevis 147 connected to the piston shaft 136, not seen in this view, is also connected by shaft 148 and cotter pin 149 (FIG. 12) to arm 137. Arm 137 is pivotally attached to pivot mount bracket 153 by bolt 134.

The action of the solenoid 157 disposed on bracket 127 in retainer 140 causes the arm 137 to tilt from the position shown in FIG. 11 to the position shown in FIG. 22—IE from the ascending rightwardly to a descending rightwardly position. When the junction at 139 is in the up position, the rider 138 is up and the threaded rod 130 retains the clamp 154 in an up position such that a portion of the drain tube 123 is held above the elevation of the drain therefore preventing the water in the bowl from leaving by gravity. But when the arm 137 is down on the right, the shaft 130 is down and the tube 123 can sag such that water in the bowl follows gravity and drains out as the elevation of the drain tube 123 is now below the elevation of the drain of the bowl 106. Drainage of the water bowl 106 takes place at the same time as when the food is premoistens.

FIG. 12 is related to FIG. 11 but shows the same basic elements from a different perspective. The spring 143 which is connected through washer 145 is soldered or welded to the piston shaft 138 and serves to enhance the movement of the shaft to raise or lower the drain tube 123, not seen in this view but discussed supra. Bracket 153 used to pivot the arm 137 via pivot pin 156 is readily seen here attached to the solenoid 157 from electrical line 158 leads. Piston shaft 136 connected to the clevis 147 is seen disposed in the piston. Elements 147,148, and 149 have been discussed supra, as have tee 151 and its connected elements. Also seen is the L-bracket 127 that attaches to the bottom wall and which has the retention bracket 140 for the solenoid mounted thereto. See FIG. 11 as well. The solenoid is powered by electrical leads 158 that go to the main power connector not seen. Tee 151 has already been discussed.

In FIG. 13, a conventional digital timer 116 is seen. This clock, which is the same clock as seen at a distance in FIG. 3, can be set for the desired time that food should appear in the bowl be it once or twice a day as may be desired. Such timers are available from Radio Shack® and other vendors. The power cord 100 for the clock and operation of the other electrical components of this invention is also seen in FIG. 13. Once the feed times are predetermined by setting the clock timer, all of the other operations are automatically activated and controlled by the built-in timing circuit.

FIG. 14 should also be viewed in light of FIG. 19 which is a top plan view of the entire carousel which is disposed above the waste drawer 21. The close-up view of this FIG. 14 illustrates a portion of the carousel. Floor panel 113 has a head access port into which the animal places its nose and mouth to reach the carousel 47. The carousel 47 has a top wall 48 which has the feed ring 46 therein. In FIG. 19, the viewer will see these elements from a zoomed out position. The operation of the carousel and the introduction of food therein will now be discussed and the contents of FIGS. 15,16, and 17 will follow thereafter.

Figure 18:
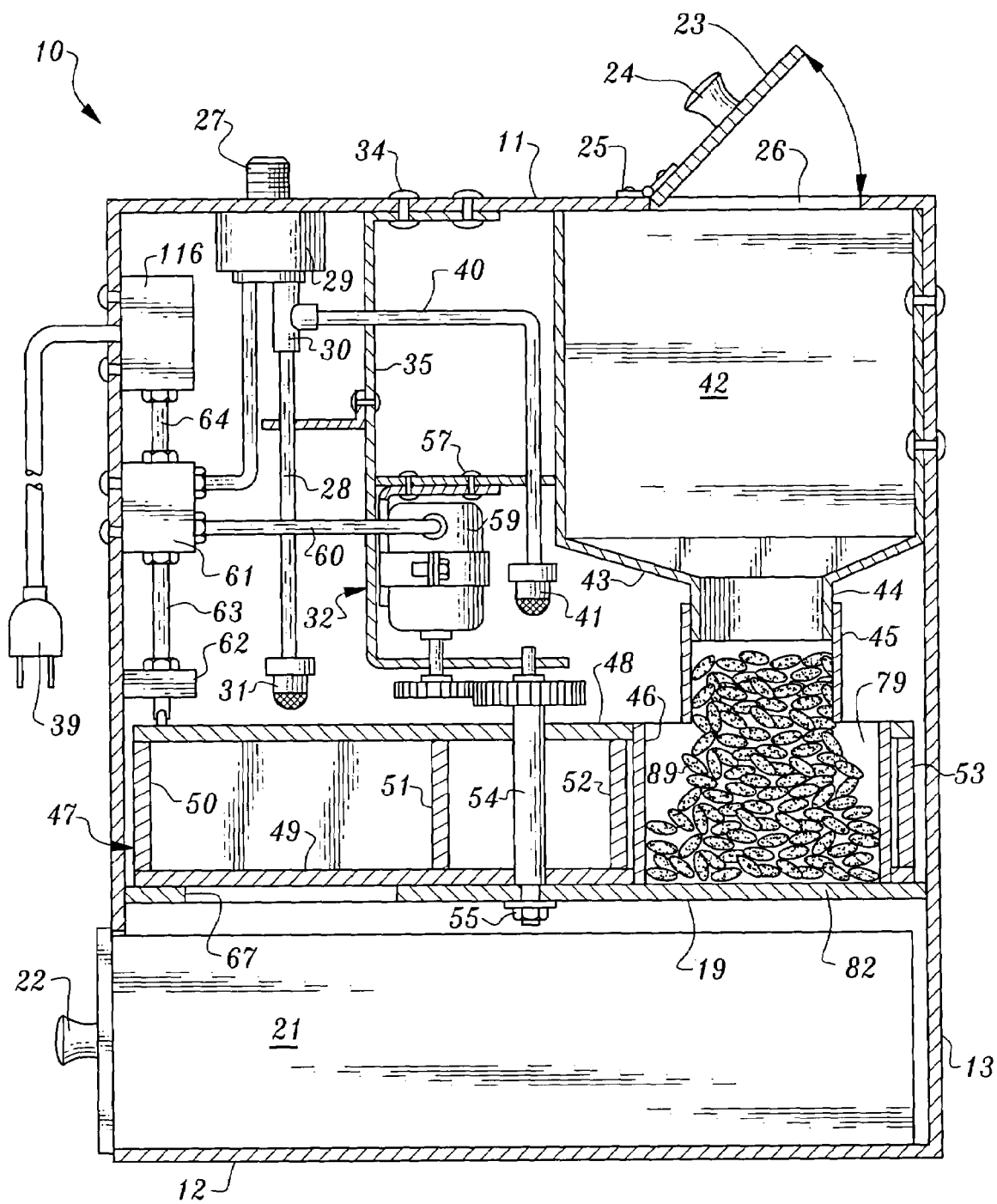
FIG. 18 is a side elevational view of my prior art invention disclosed and claimed in U.S. Pat. No. 4,422,409.

While FIG. 18 has been labeled as "prior art" because that fact is technically true, FIG. 18 still illustrates an aspect of the total apparatus of the prior patent that is reincorporated into this invention. Therefore, FIG. 18 is placed at what is believed to be a logical location in the overall scheme of things and not as the first figure as is usually done according to convention.

As is seen, the carousel 47 is provided in apparatus 10 disposed above the top of partition wall 19 with feed ring 46 disposed in the carousel. This carousel 47 is rotatably mounted, as will be discussed, and includes a rounded top wall 48, and a spaced rounded bottom wall 49, per FIG. 15, and an outside wall 50 connecting the top and bottom walls 48, 49. A bearing 54 extends through walls 48,49 and partition wall 19 and is secured at its lower terminus by lock nut and washer 55 and terminates at its upper end in toothed gear 56 meshing with drive gear 57 fixed to motor shaft 58 of a conventional DC motor 59. Shaft 58 extends through portion 36 of bracket 32. See FIG. 18. Since we are in discussion on food only, other aspects of the invention shown in FIG. 18 need not be discussed right here.

Motor 59 is mounted to bracket 32 via rivets 57 connecting the bracket to a plate extending from bracket 32. An electrical conduit 60 extends from motor 59 to an electric trip circuit 61 mounted on side wall 14. This circuit 61 is controlled by a micro switch 62 mounted in wall 14 and interconnected to circuit 61 by conduit 63. An electric conduit 64 interconnects timer 116, previously discussed, to circuit 61 with conduit interconnecting circuit 61 to motor 59.

In operation, door 23 is manually opened and food is placed in bin 42 through top opening 26 where it passes through funnel 43 and the tubular throat 44 through the collar 45 to feed ring 46. Water is periodically introduced through fitting 27 via timer 38 and solenoid 29 to spray water out of both nozzles 31,41. The opening in the top wall is designated 79, and as can be seen, the food pellets are piled up in the chamber 53 waiting for Rover.

Motor 59 is activated to rotate carousal 47 to move the feed ring 46 to the animal feed position 66 on wall 19 shown in dotted lines in FIG. 18. Continued rotation of carousel 47, via motor 59, is controlled by switch 62, circuit 61 and timer 116 moves the feed in the walled ring 46 which is open at the bottom over an opening 67 in the wall 19 thus dumping any waste or leftover food into drawer 21 for ultimate manual disposal. By tapering the drawer as shown in the figures and discussed, food removal therefrom is simplified. In this manner, it can be seen that there is provided a means for easily providing food and water to confined animals at controlled intervals. The circuit 61 can be preset to any desired time frame and the entire apparatus 10 may be self-contained or connected to a larger apparatus such as an animal run where the animal may frolic and return to the apparatus 10 for feeding. Nozzle 31 is adapted to spray ring 46 after feeding to rinse the same. The ring 46, after rinsing before the next feeding cycle, dries while stationary at resign place 68 indicated in dotted lines in FIG. 18. Close-up view in FIG. 14 shows the feed chamber opening 79 during the closure of rotation from one quadrant to another. Since the top wall of the carousel is solid, any excess food 89 is contained within the feed ring 46 or on top wall 48 of the carousel. See FIGS. 7 and 14.

The discussion now returns to FIG. 15 wherein the lower portion of the right side of the apparatus is seen. Wall 21R is one side wall of the drawer 21, previously discussed, which is used for the collection of wastewater. The structure of carousel 47, which rotates on bottom wall 49, is also seen. Reference to FIG. 19 is made as this shows the entire carousel 47 including the top wall 48 and the single feed bowl which rotates from location to location. Thus designator 66 designates an at rest position while the position where the pet food is seen is the rotated position for filling the feed bowl, position 68 is also an at rest position while access is gained by the pet at the front location adjacent the handle 22 of the drawer 21. The food is accessed via opening 67 in the top wall 48. Tubing 28 and spray nozzle 31 are seen here disposed above the opening for the animal's head, and these two elements, also seen in FIG. 18, serve to premoisten the food for the animal to render digestion easier.

Element 62 a micro switch and the protrusion 78 that serves as a stop point will be discussed infra with respect to the provision of water to the animal. Motor shaft 58 of motor 59 and gear 56 have been discussed supra. Thus, the discussion can now return to FIG. 15.

As can be seen the carousel 47 rotates on grid 84A upon which is disposed a shelf 19, per FIG. 9, is itself disposed on horizontal framework members 82A, one of which is seen here. Spaced up from member 82A is a similar member 82 on both sides of the apparatus and it too retains a grid designated 84. A third such horizontal member is the lowermost member designated 82B in FIG. 15. Vertical support members 83 are located in each of the four corners and in conjunction with members 82,82A, and 82B help define the superstructure of this apparatus. In the upper right corner of FIG. 15 are seen the solenoids 118 and 119 both of which are seen close-up in FIG. 21 and which control the operation of the drain and the incoming water respectively. The actual incoming source of water is supply hose 102, which is connected to the input line 125 also seen in FIG. 9. The operation of the drain line 123 has been discussed supra in connection with FIG. 11 where elements 141 and 137 are seen in the up position such that water is retained in the drinking bowl. Contrast this to FIG. 22 wherein the drain is removing water from the drinking bowl.

FIG. 16 is a closeup interior view showing the side wall 13, the disposition of the timer 116, and the plug 39 from the motor, not shown, is controlled by said timer.

In FIG. 17 there is shown the electrical timing circuit 61 discussed in connection with FIG. 18 supra. In addition there is shown motor bracket 32 and an unnumbered circuit breaker. The motor shaft 58 is connected via gear 57 to gear 56 for carousel rotation. When the timing circuit activates the motor the gears cause the carousel to commence a 360-degree rotation cycle and during the course of rotation the draining of the water bowl and its refilling is commenced and at the proper time during the rotation of the carousel the second water stream commences and premoistens the food. After a predesignated feed time, whether or not the animal has accessed the food enclosure on the front of the housing to eat, the carousel again rotates a quarter turn and the third stream brings water to the food ring having or not having food left therein to clean it out. This waste water passes through the opening in the partition to the lower portion of the apparatus.

Figure 20:
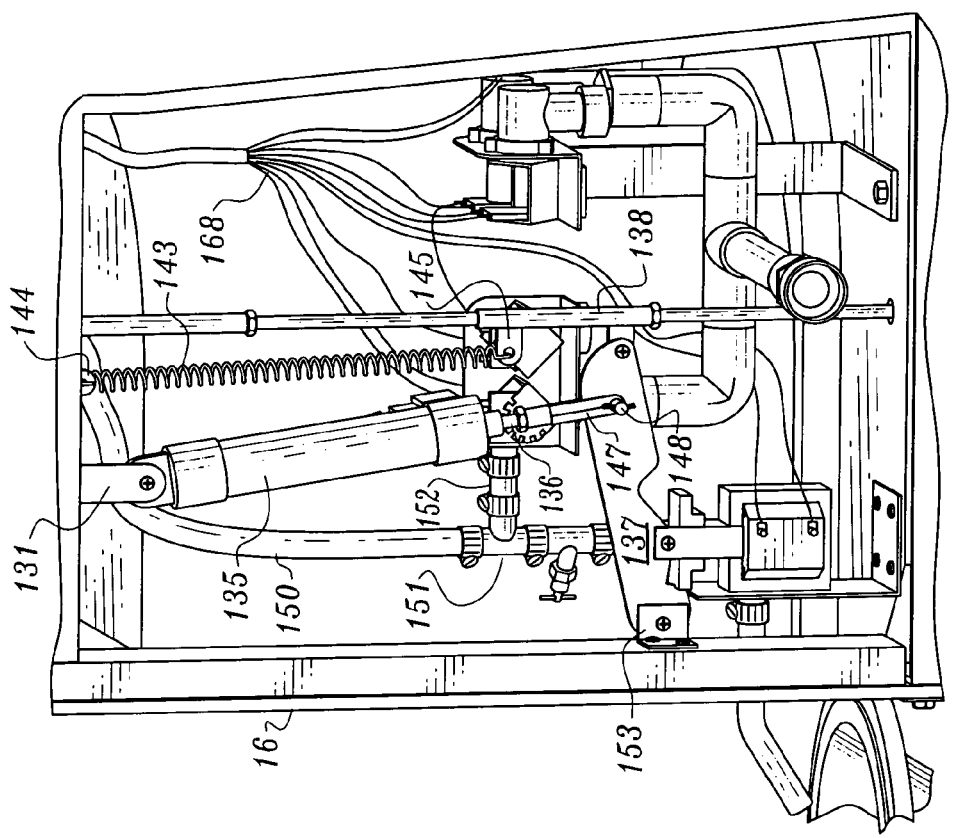
FIG. 20 is a zoomed in view based on FIG. 9.
Figure 21:
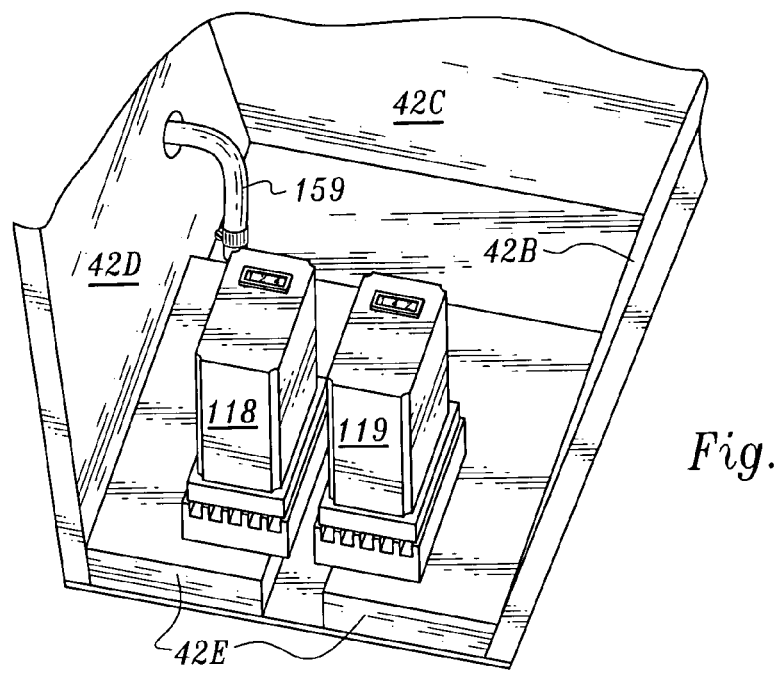
FIG. 21 is a close-up perspective view of the solenoids and the food watering line used in this invention.

FIGS. 18 and 19 have been discussed at length as has FIG. 21. A contrast may be drawn between FIGS. 20 and 23 as to respective location of arm 137. In FIG. 22 the arm is pointing down and the piston shaft 136 is seen extended which means that the drain hole is down and water is exiting the drinking trough. Contrast this with FIG. 20 wherein only a minute section of the piston shaft 136 is seen due to the fact that the drain line is being retained upwardly such that water is retained in the drinking bowl or trough as it may also be referred to, 105.

In FIG. 20, the tension spring 143 is connected as by soldering at opposite ends to a pair of spaced mounted washers 144 and 145, and acts as a return spring to help raise the drain line after water discharge. The lower washer 145 is connected to the piston shaft such that the spring once elongated tends to want to relax thus helping to pull the interconnection to the drain line upwardly, thus terminating the water discharge. See also FIG. 12. As can be seen by such reference, motor 142 is attached to mount plate 167. A series of wires 168 terminating in connectors 169 lead to the pump 128 (FIG. 9), and the timer 116 as well as to the two solenoids previously discussed.

FIG. 21 has been discussed previously. FIG. 22 is a view related to FIG. 20 and is a close-up view illustrating similar components but in a zoomed in view.

The apparatus of this invention is NOT intended to be carried by one person alone, due to both its bulk and its weight. Therefore it is deemed advisable to add a set of four conventional casters, to the underside of the apparatus. As with many generally rectangular structures, one pair preferably the locking casters are placed at the rear and the non-locking casters at the front. By doing so the apparatus of this invention can be readily moved around in the kitchen or other room or house area where located, to facilitate cleaning of the floor and the periodic cleaning of the apparatus itself. Suitable casters fall within the ⅕ to 3 inch range, and are available from such sources as Ace Hardware stores, and do it your self home centers. Since the addition of the casters by the use of screws or other fasteners are deemed conventional, no drawing need be provided.

It is seen that I have disclosed a significantly improved animal feeder, in that not only is the animal fed and the excess or waste food removed, but the animal does not drink stale water as the stale water is removed and clean water is replenished. Both of these operations take place simultaneously according to the time schedule determined by the pet owner and input to the timer.

I claim:

1. An apparatus for providing both food and fresh water to an animal which apparatus comprises:
    a housing having an upper operative portion with a food access opening therein and an accessible lower waste receiving portion,
    a partition wall disposed between the two portions,
    A rotatable carousel having spaced top and bottom walls and an opening in said top wall which carousel is disposed above the partition that separates the upper and lower portions,
    means engaged to said carousel to rotate said carousel,
    a food storage bin mounted in said upper portion above said carousel which food storage bin has an upper end for access and filling and a lower end, which lower end communicates with said opening in said carousel top wall,
    a food ring which is disposed within said carousel and being adapted to receive food from said bin for rotational timed delivery to an animal,
    a water inlet for connection to a water source mounted on said housing, said water inlet in fluid communication with three water streams to provide drinking water to the animal to premoisten dry food and to clean up a food ring after the animal eats,
    said partition also having an opening therein which communicates with the interior of said lower portion whereby excess food remaining in said food ring after the animal eats can move by gravity from said food ring through said partition opening to said lower waste receiving portion upon rotation of said carousel,
    said carousel having an animal feed position for access to said food ring which animal feed position becomes aligned and accessible through said food enclosure area in said housing upon timed rotation of said carousel,
    a water trough mounted to the exterior of said housing from which the animal can drink, and
    means to rotate said carousel.

2. In the apparatus of claim 1, further including a water trough mounted to the exterior of said housing and wherein one of said water streams is in controlled fluid communication with said water trough.

3. In the apparatus of claim 2, further including draining means in fluid communication with said trough to permit fresh water refilling of the trough.

4. In the apparatus of claim 3, wherein the an electronic timer disposed in said housing is connected to both the means to rotate said carousel and to means to drain and refill the water trough.

5. In the apparatus of claim 3, further including timing means to periodically drain said water trough and to refill said water trough.

6. In the apparatus of claim 1, wherein the second of said water streams communicates with a nozzle disposed above the food ring to premoisten food therein received from said bin when said food ring is in communication with the food access opening of the housing.

7. In the apparatus of claim 1, wherein the removable waste receiving portion is a drawer disposed beneath the partition, said drawer having an exit bore at the rear thereof.

8. In the apparatus of claim 7, wherein the drawer, in addition to spaced side walls and spaced front and rear walls, has left and right interior walls that slope both rearwardly and downwardly from the front corners of the drawer and a bottom wall that slopes rearwardly only from the front wall to ensure the egress of water that accumulates in the drawer.

9. In the apparatus of claim 1, wherein the lower end of said food bin has a tapered opening which extends downwardly into a tube having its distal end in communication with the opening in the carousel.

10. In the apparatus of claim 1, wherein the water trough is removably mounted for easy cleaning.

11. In the apparatus of claim 1, wherein the food enclosure area has an arcuate upstanding wall disposed within a framed opening.

12. In the apparatus of claim 1, wherein the housing has a hinged door normally closing off access to said food bin.

13. In the apparatus of claim 1, wherein the water inlet is a household hose connector mounted on the housing.

14. The apparatus of claim 1, wherein the means to rotate said carousel is a motor coupled thereto and further including a timing circuit electrically connected to both said motor and said water streams for both rotating the carousel at predetermined intervals and for introducing each of the three streams of water at the predetermined time during carousel rotation.

15. In the apparatus of claim 14, wherein the timing circuit actuates a solenoid to conduct the drainage of the drinking trough prior to new water introduction from the first stream.

16. In the apparatus of claim 1, wherein the food access opening comprises a framed food enclosure area having an arcuate side wall, a floor panel with a head access port therein, which access port communicates with the feed ring of the carousel when the carousel has timely rotated to permit such communication.

17. In the apparatus of claim 1, wherein the feed bin has tapered side walls and a clock timer for setting the feed time(s) is disposed through one of the housing walls for ready accessability.

18. In the apparatus of claim 1, wherein the timing circuit actuates a pair of solenoids to control the operation of the drain and the refilling of the water trough.

19. An apparatus for providing both food and fresh water to an animal which apparatus comprises:
    a housing having a top wall with a pair of doors thereon, said housing having an upper operative portion with a food access opening therein and an accessible lower waste receiving portion, said housing also having a food enclosure area,
    a partition wall disposed between the two portions, a rotatable carousel having spaced top and bottom walls and an opening in said top wall which carousel is disposed above the partition that separates the upper and lower portions, means engaged to said carousel to rotate said carousel, a food storage bin mounted in said upper portion below one of said doors and above said carousel which food storage bin has an upper end for access and filling and a lower end, which lower end communicates with said opening in said carousel top wall, a food ring which is disposed within said carousel and being adapted to receive food from said bin for rotational timed delivery to an animal, a hose connector water inlet for connection to a water source mounted on said housing, said water inlet in fluid communication with three water streams, a first stream to provide drinking water to the animal, a second water stream having a spray nozzle at the end thereof to premoisten dry food disposed above the food enclosure area, and a third nozzle disposed arcuately 90 degrees from said second nozzle for cleaning said food ring, said partition also having an opening therein which communicates with the interior of said lower portion whereby excess food remaining in said food ring after the animal eats can move by gravity from said food ring through said partition opening to said lower waste receiving portion upon rotation of said carousel, said carousel having an animal feed position for access to said food ring which animal feed position becomes aligned and accessible through said food enclosure area in said housing upon timed rotation of said carousel, a removably mounted water bowl disposed on the exterior of said housing from which the animal can drink, and means to rotate said carousel.

20. The apparatus of claim 19, further including a spout disposed over the water bowl said spout being connected to said first stream of water.

21. The apparatus of claim 19, wherein the means to rotate said carousel is a motor coupled thereto and further including a timing circuit electrically connected to both said motor said water streams for both rotating the carousel at predetermined intervals and for introducing each of the three streams of water at the predetermined time during carousel rotation.

22. In the apparatus of claim 19, wherein a clock timer for setting the feed time(s) is disposed through one of the housing walls for ready accessability.

23. In the apparatus of claim 19, further including a drainage line connected to the exit bore at the rear of drawer.

* * * * *